Jan. 5, 1954    E. P. McDONALD ET AL    2,665,361
ARTICLE FOR FLASH WELDING TRACK ROLLERS
Filed Dec. 9, 1950    2 Sheets-Sheet 1

INVENTORS
EDWIN P. MC DONALD
JAMES CONLOGUE

Paul O. Pippel
ATT'Y

INVENTORS
EDWIN P. MCDONALD
JAMES CONLOGUE

ATTY

Patented Jan. 5, 1954

2,665,361

UNITED STATES PATENT OFFICE 2,665,361

ARTICLE FOR FLASH WELDING TRACK ROLLERS

Edwin P. McDonald and James Conlogue, Chicago, Ill., assignors to International Harvester Company, a corporation of New Jersey Application December 9, 1950, Serial No. 200,068

4 Claims. (Cl. 219—4)

This invention relates to an improved method of welding individual parts into a unitary structure. More specifically this invention relates to a method for welding hollow track roller components of the type used in crawler tractors, into a unitary structure, including an article adapted to be inserted within a cavity formed by the welded parts for protecting the cavity from weld splatter.

During the welding operation wherein a pair of complementary half portions are welded together such as may be performed during the welding of track rollers for crawler tractors, the interior cavity formed by the rollers is subjected to a great deal of flash or weld splatter. Weld splatter is inherently a part of a flash welding operation, and when the contiguous complementary edges of a track roller are fused together during flash welding, the interior surfaces of the cavity are covered with a hard scale of flash splatter. The cavities formed by the uniting of the half portions of the roller may be used as lubricant chambers, and thus the flash scale or weld splatter which adheres to the cavity walls must be removed before the article is finished. It can readily be seen that removal of the splatter presents a problem since it will require the insertion of machine tools and subsequent machining. This operation, therefore, is time consuming and costly. Applicants have provided a new and improved process for welding track rollers or like parts, the process eliminating the need for removing the flash splatter from the rollers by costly machining operations.

It is a prime object of this invention, therefore, to provide an improved process for removing flash weld splatter from the interior cavity of a welded structure.

Still another object is to provide an improved process for flash welding track rollers, the process including the step of inserting a frangible core within the cavity formed by the rollers, the said core forming a protective shield or surface over the interior surfaces of the cavity to support the flash splatter free of said surfaces.

Still another object is to provide a frangible coating for the interior surfaces of a cavity formed by a pair of complementary hollow parts positioned with their edges in contiguous relation for welding, the frangible coating being adapted to provide a protective surface for the flash splatter incident to a flash welding operation.

A still further object is to provide an improved process for flash welding track rollers, the process including the insertion of a frangible core within a cavity formed by the track rollers, the core providing a protective surface for the flash splatter incident to the welding operation, and subsequently punching out the frangible core and the flash splatter free of the weld.

Still another object is to provide a core article for use in welding a pair of track rollers, the core article consisting of a frangible, electrically non-conducting material.

Still a further object is to provide a core for use in flash welding, the core being dish-shaped and having projections directed inwardly toward the center of the core.

These and other objects will become more readily apparent from a reading of the specification when taken in connection with the accompanying drawings.

Figure 1:
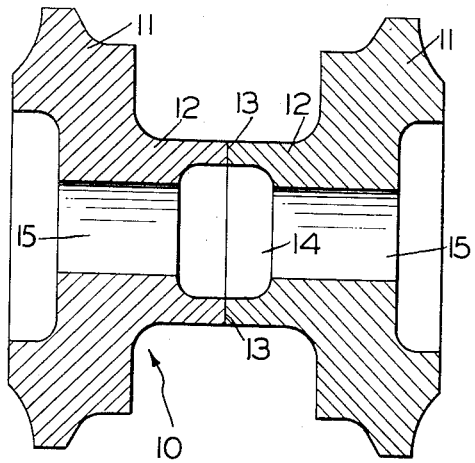
Fig. 1 is an elevational view in cross section through a track roller showing complementary portions of the roller positioned for welding.

A track roller is generally referred to by the reference character 10. The track roller includes a pair of complementary half portions 11 which, as shown in Figs. 1 through 6, have hub portions 12 positioned in complementary relation for welding the parts together into a unitary structure. Edge portions 13 of the hub portions 12 are shown in close contiguous relation. The present process and improvement are particularly applicable to the manufacture of track rollers of the conventional type. The process, however, is also adapted to be used in any welding operation where complementary half portions are to be united to form a unitary structure having a cavity adjacent the fused portions of the weld.

Figure 2:
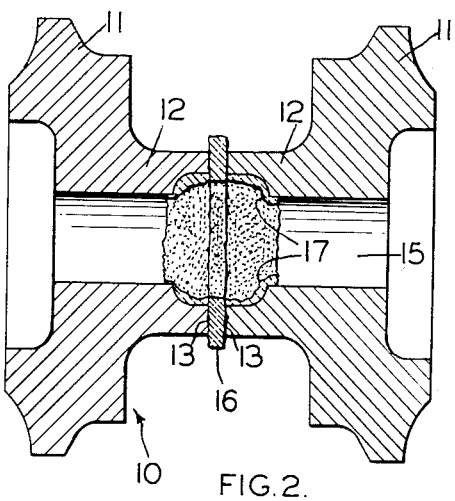
Fig. 2 is a sectional view similar to Fig. 1 showing a track roller immediately after component parts have been welded together.

A cavity 14 is formed by the complementary halves 11 of the track roller 10. The cavity 14 is in communication with a pair of oppositely disposed and aligned apertures or openings 15. As best shown in Fig. 2, during the conventional welding operation the complementary edge portions 13 of the track roller 10 are welded together by means of a weld 16. This may be a flash weld operation, and the half portions 11 are thus rigidly and securely fused together as indicated by the weld 16. In a conventional flash welding operation the formation of weld or flash splatter is incidental thereto. Thus, as shown in Fig. 2, the interior surfaces of the cavity 14 are covered with a hardened scale or flash splatter 17. This flash splatter must in the conventional operation be removed by machining. In view of the enclosed nature of the cavity 14, it can be seen that the machining operation is generally quite difficult, costly, and increases the cost of the final product manifold.

Applicants have provided an improved article for overcoming the difficulties encountered in the flash welding operation of articles of the type shown. A cup-shaped core is indicated by the reference character 18, the core being particularly shown in Fig. 7. The core 18 is made of a frangible or refractory material which will hold its shape and can easily be broken when it is desired to remove the same from the track roller. Applicants have used a baked sand core which has functioned in a very satisfactory manner. It must, however, be understood that other types of materials may be utilized and that the invention is not limited to a core made of a certain material.

Figure 7:
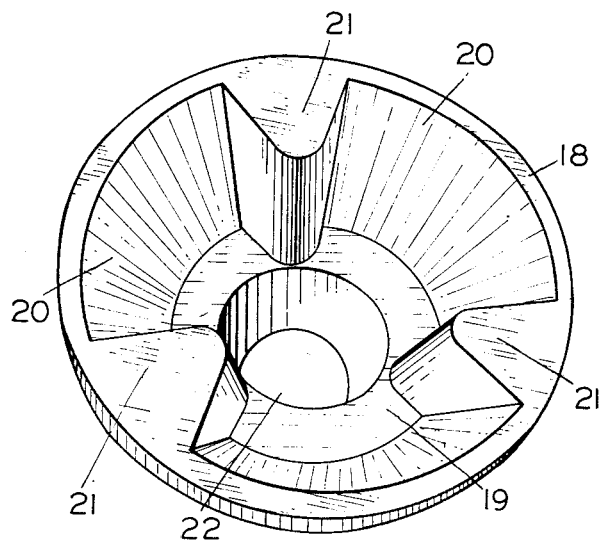
Fig. 7 is a perspective view of a frangible core adapted for use in the improved welding process.
Figure 3:
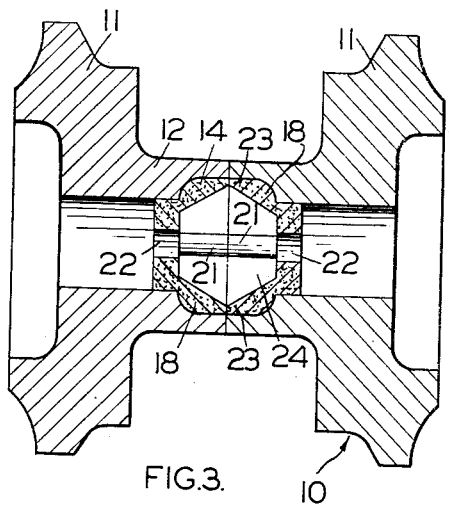
Fig. 3 is a cross-sectional view in elevation through a track roller, the track roller having complementary portions positioned together for welding with a frangible core inserted within the cavity formed by the track rollers.

The core 18 includes a flat central portion 19 which is integrally formed with a diverging cylindrical portion 20. As best shown in Figs. 3 and 7, the core is provided with inwardly extending projections 21, the purpose of which will be presently described.

The core portions 18 are inserted within the cavity, as best shown in Fig. 3, in complementary relation. The central portion 19 is provided with openings 22, these openings acting as vent openings for the cavity 14 during the welding operation. Contiguous edges 23 of the frangible cores 18 are positioned in contiguous relation to form a hollow enclosure 24. The cores 18 are so shaped as to conform to the inner surfaces of the cavity 14 and thus provide a protective shield over the surfaces of said cavity.

Figure 4:
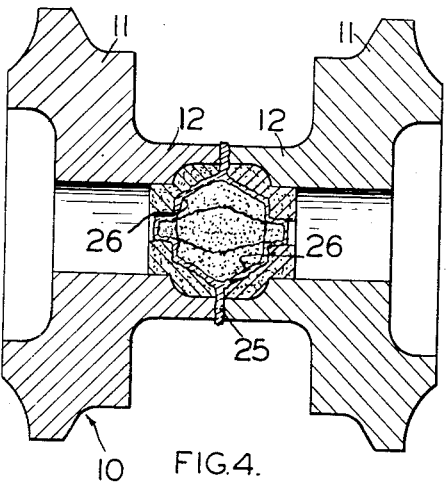
Fig. 4 is a view similar to Fig. 3, the view showing the track roller and its internal parts immediately after a welding operation.
Figure 5:
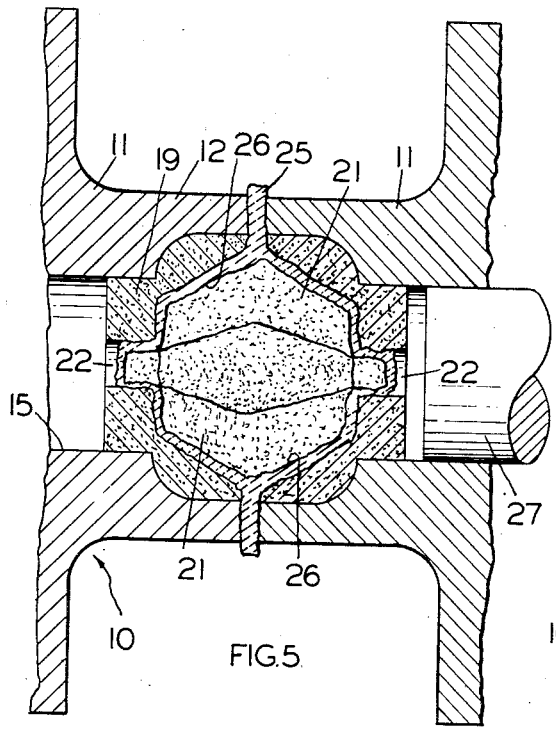
Fig. 5 is a cross-sectional view in elevation similar to Fig. 4, showing a track roller ready for a punching operation designed to remove the frangible and flash splatter from the interior cavity of the roller.

During the welding operation, the contiguous edge portions 13 of the track roller are welded together by a flash welding apparatus to provide a weld 25 rigidly fusing the track roller halves together. Weld splatter is generally designated by the reference character 26. As best shown in Figs. 4 and 5, this weld splatter flows along the inner surfaces of the hollow enclosure 24 and completely covers the same. The openings 22 provide a sufficient vent to permit gases to escape during the welding operation. The weld splatter covers the inner surfaces of the hollow enclosure 24 and is maintained away from the surfaces of the cavity 14. As best shown in Figs. 3 and 5, the weld splatter 26 also covers the inwardly extending projections 21. After the track roller has thus been welded together it is desired to remove the flash splatter and the cores 18. A punch 27 is inserted through one of the apertures 15 and the punch is moved toward the cores 18 and the weld splatter. As the punch 27 is rammed through the apertures 15, the flash splatter 26 is broken away from the edges of the weld as indicated at 28 in Fig. 6. The core 18, being of frangible material, is also broken up and removed from the interior of the track roller by the punching operation. The projections 21 are exceedingly important in the successful operation of removal of the splatter and core. The projections 21 extend inwardly toward the center of the cavity so that these portions are engaged by the punch 27 when the punch is moved into engagement with the weld splatter. Thus these projections cause a formation of the weld splatter in such a manner that sufficient reenforcement of the total splatter is provided so that upon engagement of the punch with the splatter it is broken from the edges of the weld as indicated at 28.

Figure 6:
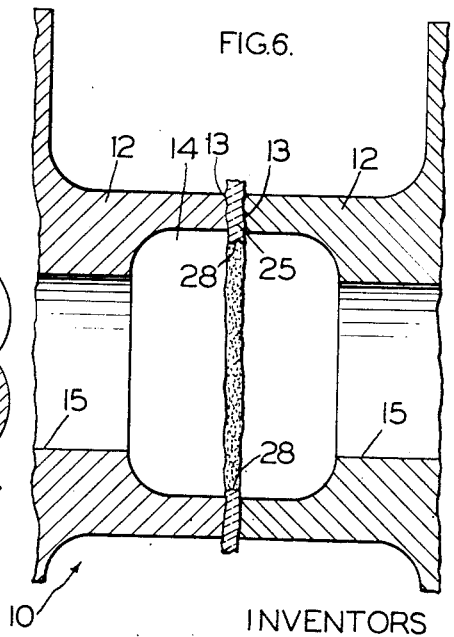
Fig. 6 is a cross-sectional view through a track roller showing the roller after the improved process has been completed.

The final result of this process is indicated in Fig. 6 wherein the weld 25 securely unites the half portions of the structure and the interior surfaces of the cavity are completely free of any weld splatter. Thus it is unnecessary to perform any machining operation and the interior of the welded roller is now ready for subsequent operations.

It can now be seen that a new and improved process for welding together the component parts of a track roller has been set forth. The flash welding operation is greatly facilitated and the need for final machining is completely avoided since the flash splatter can be readily removed by a punching operation. An improved core structure has also been disclosed, this core structure being adapted to be inserted into the cavity of a track roller for providing a protective shield for the interior surfaces of the cavity and to maintain any flash splatter incident to the welding operation away from the sides of the cavity.

During the welding operation the edge portions of the core are placed immediately adjacent the parting line of the two half portions of the rollers. The edges can be placed to touch one another since the weld splatter will penetrate through the core into the hollow space. The core could be constructed in one piece with the portion of the core which is to be positioned adjacent the parting line of a relatively thin frangible construction. Thus upon welding, the weld splatter would penetrate through the hollow space.

It must be understood that further changes may be made in the process or the article without departing from the spirit of the invention as disclosed nor from the scope thereof as defined in the appended claims.

What is claimed is:

1. A protective insert for protecting the walls of a cavity in a welded member from weld splatter comprising a cup-shaped member having a wall portion provided with an opening, a cylindrical side wall diverging outwardly from said wall portion, and a plurality of members on said side wall, said members projecting inwardly toward the center of said insert.

2. A protective welding insert comprising a member of refractory material, said member including a central wall portion, and a cylindrical wall projecting axially from said flat central portion to form a cup-shaped member, said cylindrical wall including a plurality of projecting members extending inwardly toward the axis of said insert, the outer surface of said cylindrical wall being adapted to lie in contacting relation and to cover the inner wall of a hollow welded member whereby flash splatter from a flash welding operation is deposited on the inner surface of said cylindrical wall in said cup-shaped chamber free of the walls of the welded member.

3. A protective welding insert in accordance with claim 2, including an inner surface on said cylindrical wall tapering outwardly from said central wall.

4. For use in the operation of flash welding continguous edge portions of a pair of metal members having bores into a unitary structure with the bores in axial alignment; a protective welding insert, the insert comprising a pair of members of frangible material, each member including a substantially flat central wall portion, a cylindrical wall projecting longitudinally from the central wall portion to provide a cup-shaped chamber, projections on the cylindrical wall extending inwardly toward the axis of the cup-shaped member, said frangible members being positionable within the bores of the metal members with the chambers in opposed relation to provide an enlarged chamber, and with the outer surfaces of the cylindrical walls of the inserts extending longitudinally along a portion of the bores and in contact therewith, whereby the flash splatter is deposited against the inner surfaces of the cylindrical walls within the enlarged chamber free of the bores of the metal members.

EDWIN P. McDONALD.
JAMES CONLOGUE.

References Cited in the file of this patent

UNITED STATES PATENTS

| Number | Name | Date |
|---|---|---|
| 1,971,369 | Coryell | Aug. 28, 1934 |
| 1,979,712 | Smith | Nov. 6, 1934 |
| 2,031,863 | Snell | Feb. 25, 1936 |

FOREIGN PATENTS

| Number | Country | Date |
|---|---|---|
| 463,802 | Great Britain | Apr. 7, 1937 |